(12) United States Patent
Akiyama

(10) Patent No.: US 7,057,776 B2
(45) Date of Patent: Jun. 6, 2006

(54) IMAGE PROCESSING APPARATUS, IMAGE PROCESSING METHOD AND COMPUTER-READABLE RECORDING MEDIUM ON WHICH IMAGE PROCESSING PROGRAM IS RECORDED

(75) Inventor: Minoru Akiyama, Tokyo (JP)

(73) Assignee: NEC Corporation, Tokyo (JP)

( * ) Notice: Subject to any disclaimer, the term of this patent is extended or adjusted under 35 U.S.C. 154(b) by 944 days.

(21) Appl. No.: 09/793,265

(22) Filed: Feb. 26, 2001

(65) Prior Publication Data

US 2001/0019432 A1 Sep. 6, 2001

(30) Foreign Application Priority Data

Mar. 6, 2000 (JP) .............................. 2000-060188

(51) Int. Cl.
H04N 1/04 (2006.01)
H04N 1/40 (2006.01)
(52) U.S. Cl. ........................ 358/462; 382/266; 358/474
(58) Field of Classification Search ................. 358/1.9, 358/2.1, 443, 447, 462, 464; 382/176, 177, 382/179, 199, 202, 266, 314, 315; 355/4.74
See application file for complete search history.

(56) References Cited

U.S. PATENT DOCUMENTS

| | | | | |
|---|---|---|---|---|
| 5,477,346 A | * | 12/1995 | Murata | 358/529 |
| 5,548,319 A | * | 8/1996 | Kwon | 347/183 |
| 6,034,785 A | * | 3/2000 | Itoh | 358/1.18 |
| 6,115,148 A | * | 9/2000 | Imai et al. | 358/500 |
| 6,441,915 B1 | * | 8/2002 | Imaizumi et al. | 358/1.15 |
| 6,646,759 B1 | * | 11/2003 | Koga | 358/1.9 |
| 6,788,436 B1 | * | 9/2004 | Yoshida et al. | 358/475 |

FOREIGN PATENT DOCUMENTS

| | | |
|---|---|---|
| JP | 5-138945 | 6/1993 |
| JP | 06-227041 | 8/1994 |
| JP | 6-234240 | 8/1994 |
| JP | 09-305755 | 11/1997 |
| JP | 11-331605 | 11/1999 |
| KR | 1999-0031583 | 5/1999 |

OTHER PUBLICATIONS

Copy of Korean Office Action dated Jun. 27, 2003 (and English translation of relevant portion0.
Copy of Japanese Office Action dated May 30, 2003 (and English translation of relevant portion).

* cited by examiner

Primary Examiner—Jerome Grant, II
(74) Attorney, Agent, or Firm—Dickstein, Shapiro, Morin & Oshinsky, LLP.

(57) ABSTRACT

To improve a sharpness and quality of images. An image processing apparatus includes: a drawing process unit for analyzing drawing information in print data; a color spatial conversion unit for transforming color information; a smoothing correction unit for outline-correcting the print data; a gradation processing unit for processing a gradation of the print data; and an output unit for performing a predetermined process based on text image data output from the smoothing correction unit and image data output from the gradation processing unit to output print image information to the outside, and the color spatial conversion unit separately sets intensity values, and the output unit outputs the text image data provided from the smoothing correction unit by priority over a text image data provided from the gray scale processing unit, according to an analysis of drawing information.

14 Claims, 11 Drawing Sheets

FIG. 2

| PRINT DATA D10 | | |
|---|---|---|
| DRAWING PROCESS DATA (1) | DRAWING INFORMATION D11 | CHARACTER DRAWING |
| | DRAWING PROCESS INFORMATION D12 | THE NUMBER OF CHARACTERS, COORDINATES AT WHICH DATA IS DRAWN, ETC. |
| | COLOR INFORMATION D13 | RGB, CMY, CMYK |
| | DATA D14 | CHARACTER DATA |
| DRAWING PROCESS DATA (2) | DRAWING INFORMATION D11 | IMAGE DATA DRAWING |
| | DRAWING PROCESS INFORMATION D12 | COORDINATES AT WHICH DATA IS DRAWN, ETC. |
| | COLOR INFORMATION D13 | RGB, CMY, CMYK |
| | DATA D14 | IMAGE DATA |
| ... | ... | ... |
| DRAWING PROCESS DATA (n) | DRAWING INFORMATION D11 | FIGURE (LINE) DRAWING |
| | DRAWING PROCESS INFORMATION D12 | THE NUMBER OF LINES, COORDINATES AT WHICH DATA IS DRAWN |
| | COLOR INFORMATION D13 | RGB, CMY, CMYK |
| | DATA D14 | LINE DATA |

IMAGE PROCESSING APPARATUS, IMAGE PROCESSING METHOD AND COMPUTER-READABLE RECORDING MEDIUM ON WHICH IMAGE PROCESSING PROGRAM IS RECORDED

BACKGROUND OF THE INVENTION

1. Field of the Invention

The present invention relates to an image processing apparatus, an image processing method, and a computer-readable recording medium on which an image processing program for improving the sharpness and quality of an image is recorded.

2. Description of the Related Art

Image output apparatuses of recent years directly process input multi-value image data as is, to increase the number of representable gradations and colors. On the other hand, there are demands that the image output apparatuses have an outline processing function for handling the multi-value image data in order to eliminate the jaggies of diagonal lines of binary image data such as dark color characters and graphics.

Japanese Patent Laid-Open No. 5-138945 discloses an image output apparatus which was developed in order to meet the above-mentioned social demands. The image output apparatus performs interpolation and gradation processing on images that are adapted to the minimum pixel of a printer engine according to the type of image information.

Japanese Patent Laid-Open No. 6-234240 discloses an image forming apparatus developed in order to meet the above-mentioned social demands. The image forming apparatus comprises color pattern generation unit for reproducing a color image through a color processing unit 504, extraction device for extracting a predetermined image signal through a black dot detecting unit 507, image smoothing unit for passing the image signal extracted by the extraction unit through a pulse width modulation unit 503 to smooth the image, and optical scanning unit for scanning a image carrier by using a light beam modulated according to the above-mentioned image signal, as shown in FIG. 11. In FIG. 11, reference number 505 indicates a smoothing unit, reference number 502 indicates a storage unit, reference number 505 indicates a multi-value signal delay unit, reference number 506 indicates a γ (gamma) correction unit, and reference number 508 indicates a frequency divider.

The above-mentioned pulse width modulation unit 503 is configured so as to latch a multi-value image data, MVIDEO, and input it to the negative inputs of comparators 603 and 604, as shown in FIG. 12. The comparators 603, 604 compare an image clock signals, VCLK and ½ VCLK with the latched signal to modulate the pulse width. In FIG. 12, reference number 601 indicates a latch circuit, reference number 602 indicates a digital-to-analog converter, reference number 605 indicates a selector, reference number 606 indicates an OR circuit, and SVIDEO indicates binary image data.

The image output apparatus disclosed in Japanese Patent Laid-Open No. 5-138945 performs the above-mentioned interpolation or gradation processing after a complex data detection process such as area determination.

The image output apparatus disclosed in Japanese Patent Laid-Open No. 6-234240 performs color processing and black pixel binarization at the same time, therefore the black pixels contained in image information, which do not require smoothing process, are also binarized and smoothed. Furthermore, because the binarized image data is modulated by multi-value image data output from the γ correction unit 506 when the pulse width modulation unit 503 applies pulse width modulation to the binarized image data generated by the smoothing processing unit 501, the smoothing processing is not correctly performed.

BRIEF SUMMARY OF THE INVENTION

Object of the Invention

It is an object of the present invention to solve the problems with the above-mentioned prior arts and, in particular, to provide an image processing apparatus, an image processing method, and a computer-readable medium containing an image processing program that can improve the sharpness and quality of an image by correctly performing a smoothing process on only diagonal lines of dark color characters and graphics affected by gradation processing.

SUMMARY OF THE INVENTION

To achieve the above-mentioned object, the present invention according to claims 1 to 7 provides, as a basic configuration, a receiving unit for receiving predetermined print data sent from an upper node, an outline correction unit for correcting said print data based on information output from said receiving unit, and an output unit for performing a predetermined process on said print data based on outline processing information output from said outline correction unit to output said print data as print image information to the outside.

The receiving unit described above has the drawing analysis function of analyzing the print data into text drawing data representing characters and lines contained in the print data described above and image drawing data representing other images.

Thus, according to the present invention set forth in claims 1 through 7, the text drawing data and the image drawing data are first analyzed and text image data in the print data is distinguished from other image data in the print data. Therefore the problem that different types of print data are outline-corrected at the same time can be avoided and the text image data in the print data can be identified to perform outline correction on the text image data.

As set forth in claim 2, the color information conversion unit may be configured so as to set color information associated with specific text drawing data output from the receiving unit at a certain intensity value and set color information associated with the image drawing data at a predetermined value below the maximum intensity value, separately. The outline correction unit may be configured so as to perform outline correction on certain text image data in the print data output from the color information conversion unit.

Configured in this way, the specific color information associated with the text drawing data is set at a certain intensity value and the color information associated with the image drawing data is set at a value that is below the maximum intensity value and different from the certain intensity value by the color information conversion unit. In other words, only the text image data is set at the certain value.

Thus, a situation in which image data other than the text image data is mixed in the image data set at the certain intensity value can be avoided and outline correction can be applied to only the text image data by identifying the image data having the certain intensity value to perform the outline correction on the identified image data.

The gradation processing unit may be configured so as to process the gradations of image data output from the receiving unit. In addition, the output unit may output the text image data provided from the outline correction unit to the outside by priority over the text image data provided from the gradation processing unit.

In this configuration, the text image data provided from the outline correction unit is output to the outside by the output unit by priority over the text image data provided from the gradation processing unit. This unit that the text image data provided form the outline correction unit is directly output to the outside without gradation processing. Thus, the problem that text image data outline-processed is modulated by the effect of the gradation processing unit can be effectively avoided, and therefore the sharpness and quality of images can be further improved.

The color conversion unit may set all the intensity values of the color information associated with the text drawing data provided from the receiving unit that exceed a predetermined threshold at the maximum intensity value.

In this configuration, the color information associated with the text drawing data is set at the maximum intensity value and the color information associated with the image drawing data is set at a value below the maximum intensity value. This unit that image data for which the maximum value is set is only the text image data. Thus, only the text image data is properly outline-corrected by identifying the image data having the maximum intensity value to applying outline correction to the identified image data.

The outline correction unit may be configured so as to output correction select information indicating whether a pixel is to be corrected or not, first intensity information indicating the intensity of the pixel to be corrected, and first center-of-gravity information indicating the center of gravity of the pixel. In addition, the gradation processing unit may be configured so as to output second intensity information indicating the intensity of a pixel to be gradation-processed and second center-of-gravity information indicating the center of gravity of the pixel. When the pixel to be corrected is output from the outline correction unit, the output unit may select, on a dot basis, the first intensity information and first center-of-gravity information of the corresponding pixel output from the outline correction unit and output it as the print image information to the outside. When a pixel not to be corrected is output from the outline correction unit, the output unit may select the second intensity information and the second center-of-gravity information on a dot basis to output it as the print image information to the outside.

By configuring in this manner, one-dot image information is generated based on the first center-of-gravity information and first intensity information for a pixel to be outline corrected, or image information is generated based on the second center-of-gravity information and second intensity information for a pixel not to be outline-corrected. That is, the one-dot image information based on the pixel to be outline-corrected is generated without being modulated by the effect of a process performed on a pixel gradation-processed. Thus, the problem that image information based on a pixel outline-correct is modulated by the effect of the gradation processing unit can be effectively avoided.

The outline correction unit may be configured with a binarization unit for binarizing image data to generate binary image data and an outline correction unit for performing an outline process on the binary image data output from the binarization unit by using pattern matching.

In this configuration, pixels with the maximum intensity in the binarized image data are converted into "1" and the other pixels are converted into "0." That is, only pixels or text image data are converted into "1." Thus, identifying pixels converted into "1" and performing the outline process on those pixels will result in the pixels of the text image data being outline-processed.

According to the present invention set forth in claim 8, the gradation processing unit may consists of a line buffer for storing image data corresponding to a pixel of interest in performing the above-mentioned outline correcting function and a multi-value dithering unit for multi-value dithering the image data stored in the line buffer according to a predetermined multi-value dither pattern.

In this configuration, the image data to be outline-corrected is sent to the multi-value dithering unit with a predetermined timing. Thus, the same pixel to be outline-corrected in the outline correction is dithered in the multi-value dithering unit with the predetermined timing.

According to the present invention set forth in claim 9, the outline correction unit and the gradation processing unit in the above-described claims 3 to 8 may be configured in a way that the image data is input according to a timing signal.

In this configuration, the image data is input into the outline correction unit and the gradation processing unit according to the timing signal. That is, the image data is processed by the outline correction unit and the gradation processing unit independently of each other. Thus, overlapping processing can be avoided in which the gradation processing unit would perform a gradation process on information to be outline-processed.

To achieve the object mentioned above, the present invention according to claims 10 through 13 provides, as a common basic configuration, a first step of receiving predetermined print data sent from an upper node and drawing it in a storage unit, a second step of outline-correcting the predetermined prescribed image data drawn in a storage unit, and a third step of outputting the outline-corrected image data as image information for printing to a print unit.

And, in the above described first step it is commonly adopted as a basic configuration to analyze the given print data into text drawing data representing drawing of a character or line and drawing other than the text drawing data.

Thus, according to the present invention set forth in claims 10 through 13, the text drawing data and the image drawing data are analyzed and the text image data and graphics image data are distinguished from each other, thereby avoiding a situation in which different types of print data are outline-processed at the same time. Thus, the text image data can be identified faster and the text image data can be outline-corrected accurately and reliably by identifying the text image data.

Color information associated with specific text image data is all set at a certain intensity value and color information associated with the graphics image data is set at a predetermined value that is below the maximum intensity value and different from the certain value. The above-mentioned print data may be provided to the above-mentioned storage unit and drawn there. The image data in the second step may be a specific text image data.

In this way, specific color information associated with the text drawing data is set at a certain intensity value and color information associated with the image drawing data is set at a value other than the certain intensity value. That is, only the image data is set at the certain value. Thus, a situation in which image data other than text image data is mixed in the image data having the certain intensity value can be avoided and the text image data can be readily identified to ensure that only the text image data is outline-corrected. The color information associated with the identified may be color information with an intensity value exceeding a predetermined threshold, for example.

The above-described second step may be designed so as to outline-correct specific text image data drawn in the storage unit and, at the same time as, before, or after this outline correction, to process the gradation of the image data drawn in the storage unit. Furthermore, the above-described third process may be configured so as to output the text outline-corrected image data to the outside by priority over the gradation-processed text image data.

In this configuration, the outline-corrected text is output to the outside by priority over the gradation-processed text image data in the third step. That is, the outline-corrected text image data is output to the outside without being gradation-processed. Thus, the problem that the outline-corrected text image data is modulated by the effect of the gradation processing can be effectively avoided and the sharpness and quality of images can be easily improved.

Furthermore, to achieve the object mentioned earlier, the present invention uses a basic configuration providing a program for causing a computer to perform the storing step of analyzing predetermined print data sent from an upper node into text drawing data representing a character or line and image drawing data representing drawing other than the text drawing data and drawing and storing the print data, the outline correction step of outline-correcting the text image data in the stored print data, and the output step of outputting the outline-corrected text image data to a print unit as image information.

Thus, according to the present invention, the text drawing data and image drawing data are first analyzed and the text image data is distinguished from the other image data in the print data in the execution phase of the program on a recording medium. That is, a situation in which different types of print data is outline-processed at the same time can be avoided. Thus, it becomes possible to grasp the text image data in the print data, and the text image data can be identified quickly and only the text image data can be outline-corrected quickly.

The memory step performed by the program may be configured so as to set color information associated with specific text drawing data determined in the drawing analysis unit mentioned above at a certain intensity value and set color information associated with image drawing data at a predetermined value below the maximum intensity value. The print data may be drawn and stored in the storage unit.

In this configuration, the color information associated with the specific text drawing data is set at the certain intensity value and the color information associated with the image drawing data is set at a value different form the certain intensity value. That is, only the text image data is set at the certain intensity value. Thus, a situation in which image data other than text image data is mixed in image data having the certain intensity value can be avoided and the text image data can be identified quickly and only the text image data can be outline-corrected quickly. The color information associated with the specific text drawing data may be color information having an intensity value exceeding a predetermined threshold, for example.

The program may be configured so as to outline-correct specific text image data in the stored print data and process the gradation of the stored image data at the same time as, before, or after the outline correction. In addition, the output step performed by the program may be configured so as to output the outline-corrected text image data to the outside by priority over the gradation-processed text image data.

By configuring in this way, the outputs the outline-corrected text image data is output to the outside by priority over the gradation-processed text data. That is, the outline-corrected data is directly output to the outside without being gradation-processed. Thus, the problem that the outline-corrected text image data is affected by gradation processing can be effectively avoided and the sharpness and quality of images can readily be improved.

BRIEF DESCRIPTION OF THE DRAWINGS

FIG. 2 is a diagram for illustrating the content of print data D10 received by a drawing processing unit shown in FIG. 1;

DETAILED DESCRIPTION OF THE PREFERRED EMBODIMENTS

A first embodiment of the present invention will be described below with reference to FIGS. 1 to 8.

Figure 1:
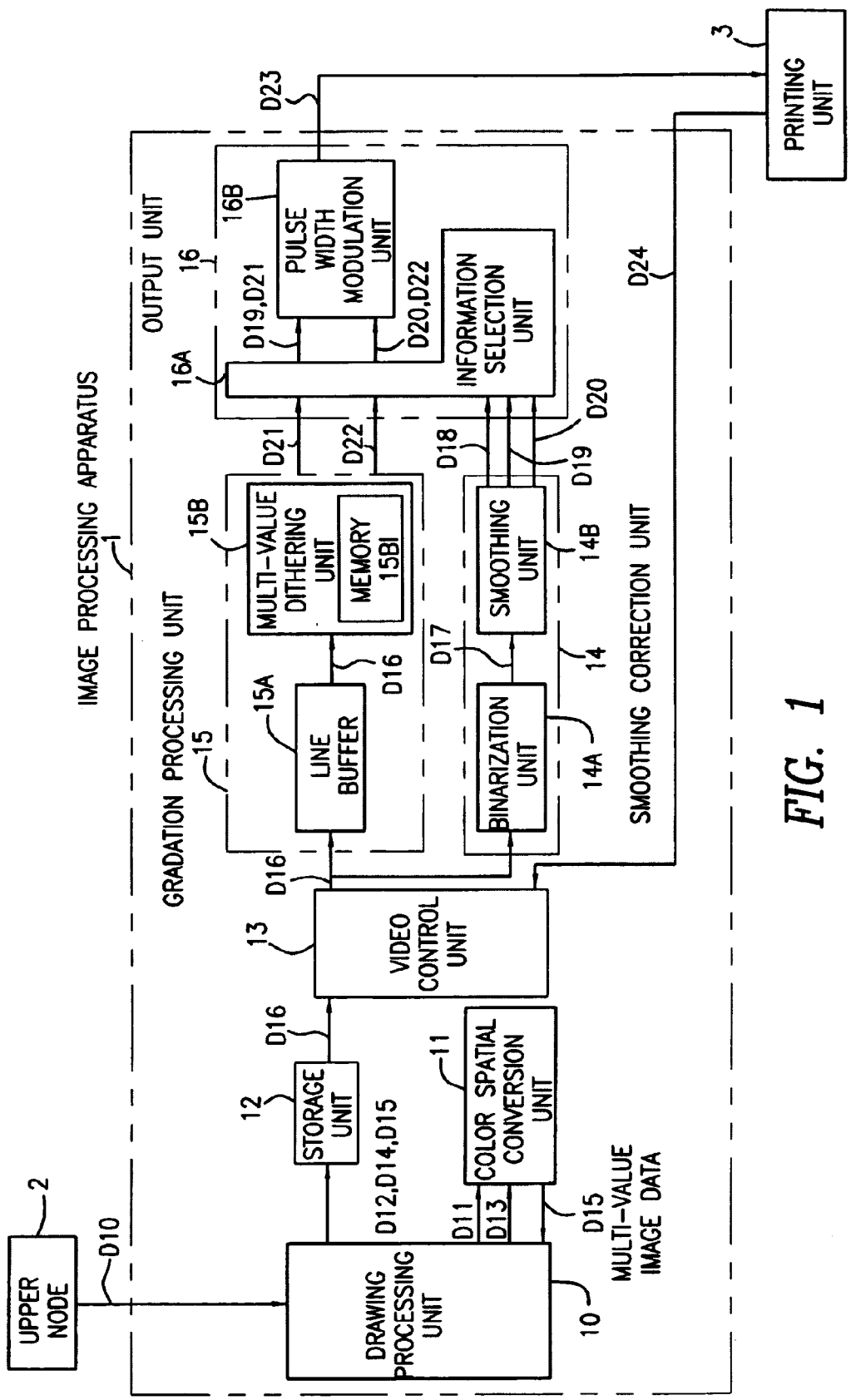
FIG. 1 is a block diagram for illustrating a configuration of an image processing apparatus according to a first embodiment of the present invention.

FIG. 1 shows a block diagram of an image processing apparatus 1 according to the first embodiment. The image processing apparatus 1 of the present embodiment as a color electrophotography printer will be described here.

The image processing apparatus 1 shown in FIG. 1 comprises a drawing process unit (receiving unit) 10 for receiving print data sent from an upper node 2, a color spatial conversion unit (color information conversion unit) 11 for transforming the print data into image data containing a color signal, and a storage unit 12 for drawing and storing the image data. The image processing apparatus 1 also comprises a smoothing correction unit 14 for smoothing image data stored in the above-mentioned storage unit 12, a gradation processing unit 15 for dithering the image data stored in the above-mentioned storage unit 12, and an output unit 16 for generating image information for printing based on the smoothing information from the above-mentioned smoothing correction unit 14 and dithering information from the above-mentioned gradation processing unit 15 and output it to an printing unit 3.

Reference number 13 indicates a video control unit.

The video control unit 13 has the function of providing image data stored in the above-mentioned storage unit 12 to the above-mentioned smoothing correction unit 14 and the above-mentioned gradation processing unit 15.

The above-mentioned video control unit 13 is designed in such a way that a sync signal sent from the above-mentioned printing unit 3 is input into it to synchronize the timing for sending the above-mentioned image data with the sync signal (timing signal).

The sections of the image processing apparatus 1 described above are operated by using a predetermined clock signal (not shown) synchronized to the above-mentioned sync signal to synchronize the operations of the entire apparatus 1.

The above-described configuration will be described below in detail.

The drawing unit 10 receives print data D10 shown in FIG. 2 from an upper node 2 (for example, a computer).

Print data D10 will be described here with reference to FIG. 2.

As shown in FIG. 2, print data D10 is provided as drawing process data 1 to n from the upper node 2. Reference numbers 1 to n indicate the serial numbers of the drawing process data. Each item of drawing process data 1 to n contains drawing information D11, drawing process information D12, color information D13, and data D14. The drawing information D11, drawing process information D12, color information D13, and data D14 will be described later.

The drawing processing unit 10 also has the capabilities of analyzing the content of drawing process data 1 to N contained in print data D10 described above and sending the above-mentioned drawing information D11 and color information D13 to the color spatial conversion unit 11.

The content interpreted by the drawing processing unit 10 will be described in detail with reference to FIG. 2.

As shown in FIG. 2, the drawing processing unit 10 determines whether the information D11 is text drawing data representing the drawing of a character or line or image drawing data representing the drawing of image data such as a bitmapped image. It also determines, for each item of the drawing process data, the number of characters (lines) and coordinates included in "drawing process information 12", whether "color information D13" is indicated by a color signal of the RGB system or that of the YMCK system, and whether "Data D14" is character data (line data) or image data.

Thus, whether the data is text drawing data or image drawing data is determined and text data and image data in the print data is distinguished in the drawing processing unit 10. This allows different types of print data to be processed at the same time, avoiding the prior-art's problem of lacking quickness and smoothing accuracy.

The color spatial conversion unit 11 has the function of converting print data into multi-value image data (text image data) D15 consisting of a Y (Yellow) signal, M (Magenta) signal, C (Cyan) signal, and K (Black) signal based on the determination sent from the drawing processing unit whether drawing information D11 is text drawing data or image drawing data and sending back the multi-value image data D15 to the drawing processing unit 10. The text image data represents multi-value image data corresponding to the text drawing data and the graphics image data represents multi-value image data corresponding to the image drawing data.

It is assumed that each of the Y, M, C, and K signals of the above-mentioned multi-value image data D15 is eight-bit data. The above-mentioned intensity value of the color signals is between "00h" and "FFh," where FFh is the maximum.

In this case, the color spatial conversion unit 11 has the function of setting the intensity value of any color information D13 associated with text drawing data exceeding a predetermined threshold at the maximum intensity value (FFh), if the drawing information D11 indicates text drawing data. On the contrary, the color spatial conversion unit 11 sets color information D13 having the maximum intensity value (FFh) at a predetermined value lower than the maximum intensity value if the drawing information D11 indicates image drawing data.

Thus, color information D13 associated with text drawing data is set at the maximum intensity value and color information D13 associated with image drawing data is set at a value lower than the maximum intensity value, thereby avoiding the problem with the prior-art examples that graphics image data is contained in multi-value image data having the maximum intensity value.

The output unit 16, which will be described later, generates one-dot pulse having a predetermined pulse width based on the intensity value (00h to FFh) set by the above-mentioned color spatial conversion unit 11. Then the above-mentioned printing unit 3 mentioned-above outputs a print having a predetermined intensity corresponding to the predetermined pulse width.

Therefore the intensity value set by the above-mentioned color spatial conversion unit 11 has a close connection with the intensity of the print output on the above-mentioned printing unit 3.

This will be described in detail below.

Figure 3:
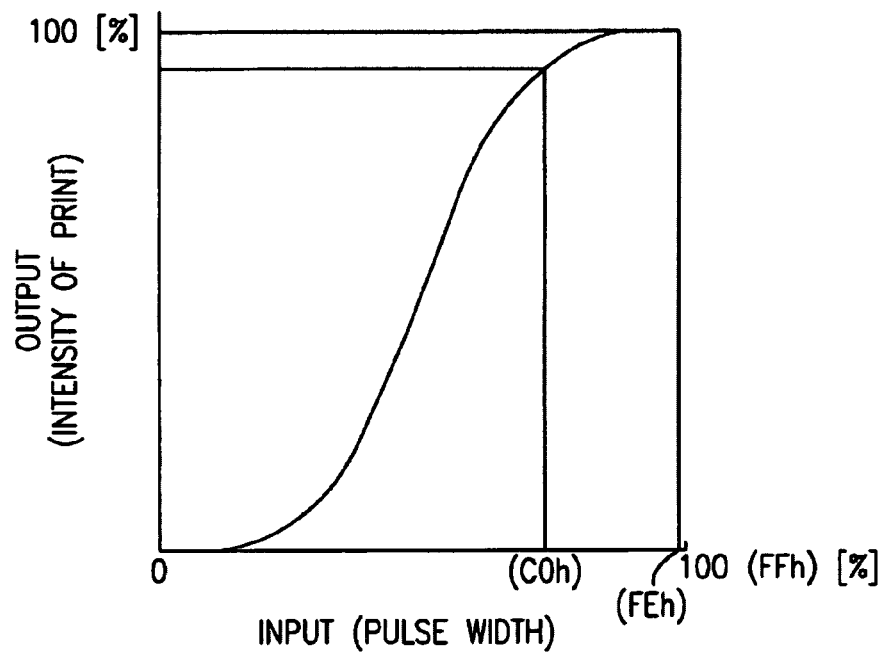
FIG. 3 is a diagram for illustrating the relation between pulse width and print intensity in a printing unit 3 shown in FIG. 1.
Figure 4:
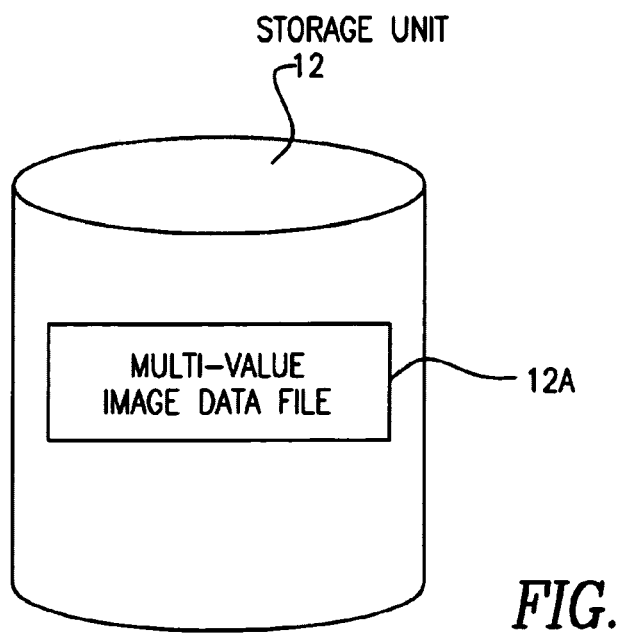
FIG. 4 is a diagram for showing an example of a file stored in a storage unit 12 shown in FIG. 1.

FIG. 3 shows a characteristic curve of inputs (pulse widths) versus outputs (the densities of a print). In FIG. 3, The inputs are indicated along the horizontal axis and outputs are indicated along the vertical axis. Data along the above-mentioned horizontal and vertical axes are indicated by values between 0% and 100%. Symbols such as FFh indicate color intensity set by the above-mentioned color spatial conversion unit 11.

The characteristic curve in FIG. 3 shows an 100% output when the input is near 100% (FFh, FEh, . . . ). That is, the intensity of the print at the maximum intensity value, FFh, predetermined above is equivalent to the intensity of the print at the predetermined value, FEh given above, below the maximum value.

Therefore the intensity of the print would not change even if color information D13 associated with image drawing data having the maximum intensity value is set at the predetermined value (FEh) lower than the maximum value by the above-mentioned color spatial conversion unit 11. Color information D13 associated with the image drawing data is set at the intensity value (FEh) to which the smoothing process, which will be described later, will not be applied.

On the other hand, when the input is between 0% and 80%, the output is between 0% and 99% in FIG. 3. In this case the output is not proportional to the input on the characteristic curve. Therefore it can be seen from this characteristic curve that the range where the output value becomes higher, that is, the range where the intensity of the print becomes visually high, is near the value C0h.

Therefore the above-mentioned color spatial conversion unit 11 sets the predetermined threshold of color information D13 associated with the text drawing data at a value such as C0h, thereby allowing smoothing, which will be described later, to be applied to any text image data having a visually high intensity.

The storage unit 12 is configured so as to store multi-value image data D16 drawn by the drawing processing unit 10. The multi-value image data D16 is used by the drawing processing unit 10 to draw multi-value image data D15 sent from the color spatial conversion unit 11 according to drawing process information D11 and Data 14, and stored in a multi-value image data file 12A in the storage unit 12 shown in FIG. 4.

The video control unit 13 has the function of extracting the multi-value image data D16 stored in the above described multi-value image data file 12A on a color signal basis of Y, M, C, and K signals according to a sync signal D24 input from the above-mentioned printing unit 3 and sending the extracted multi-value image data D16 to the smoothing correction unit 14 and the gradation processing unit 15.

Thus, the video control unit 13 sends the multi-value image data to the smoothing correction unit 14 and the gradation processing unit 15 separately. This prevents the gradation processing unit 15 from dithering the multi-value image data processed by the smoothing unit 14, therefore the multi-value image data can be processed separately by the smoothing correction unit and gradation processing.

The smoothing correction unit 14 consists of a binarization unit 14A and a smoothing unit (outline processing unit) 14B and has the function of smoothing the multi-value image data D16 sent from the video control unit 13.

The binarization unit 14A is configured so as to binarize the multi-value image data D16 sent from the video control unit 13 into binary image data D17 on a color signal basis and send the binary image data D17 to the smoothing unit 14B.

In the binarization unit 14A, the image data is binarized so that pixels in the binary image data having the maximum intensity value are converted into "1" and the other pixels are converted into "0." Thus, only the pixels of text image data are converted into "1." Therefore the smoothing correction unit 14B, which will be described later, can smooth the pixels of text image data.

The smoothing unit 14B is configured so as to perform smoothing based on the binary image data D17 sent from the binarization unit 14A and send correction select information D18 indicating whether a pixel is to be smoothed or not, center-of-gravity information (first center-of-gravity information) D19 indicating the calculated center of gravity of the pixel to be smoothed, pulse width information (first intensity information) D20 which is intensity information indicating the calculated intensity of the pixel.

This will be described in detail. The above-mentioned smoothing unit 14B determines whether a pixel of interest in the above-mentioned binary image data D17 should be smoothed according to pattern recognition with respect to a reference area, which will be described below, or not and, if it is determined that the pixel should be smoothed, sends correction select information D17 indicating "1," center of-gravity information D19, and pulse width data D20 to the output unit 16. On the contrary, the smoothing unit 14B outputs correction select information D18 indicating "0" to the output unit 16, if it is determined that the pixel should not be smoothed.

The above-mentioned reference area herein is an area which the smoothing unit 14B construct with the above-mentioned pixel of interest and reference pixels around the pixel of interest. The above-mentioned reference pixels are pixels which the smoothing unit 14B constructs by holding five lines, for example, of binary image data D17 sent from the above-mentioned binarization unit 14A.

The smoothing unit 14B determines whether a pixel in the binary image data D17 is to be smoothed or not, and, if the pixel is to be smoothed, sends the center-of-gravity information D19 and pulse width data D20 of the pixel to the output unit 16. Thus, when the pixel to be smoothed is sent to the output unit 16, the output unit 16 generates image information based on the pixel (D19, D20).

Operations of the above-mentioned smoothing correction unit 14 will be described with respect to a specific example.

Figure 5:
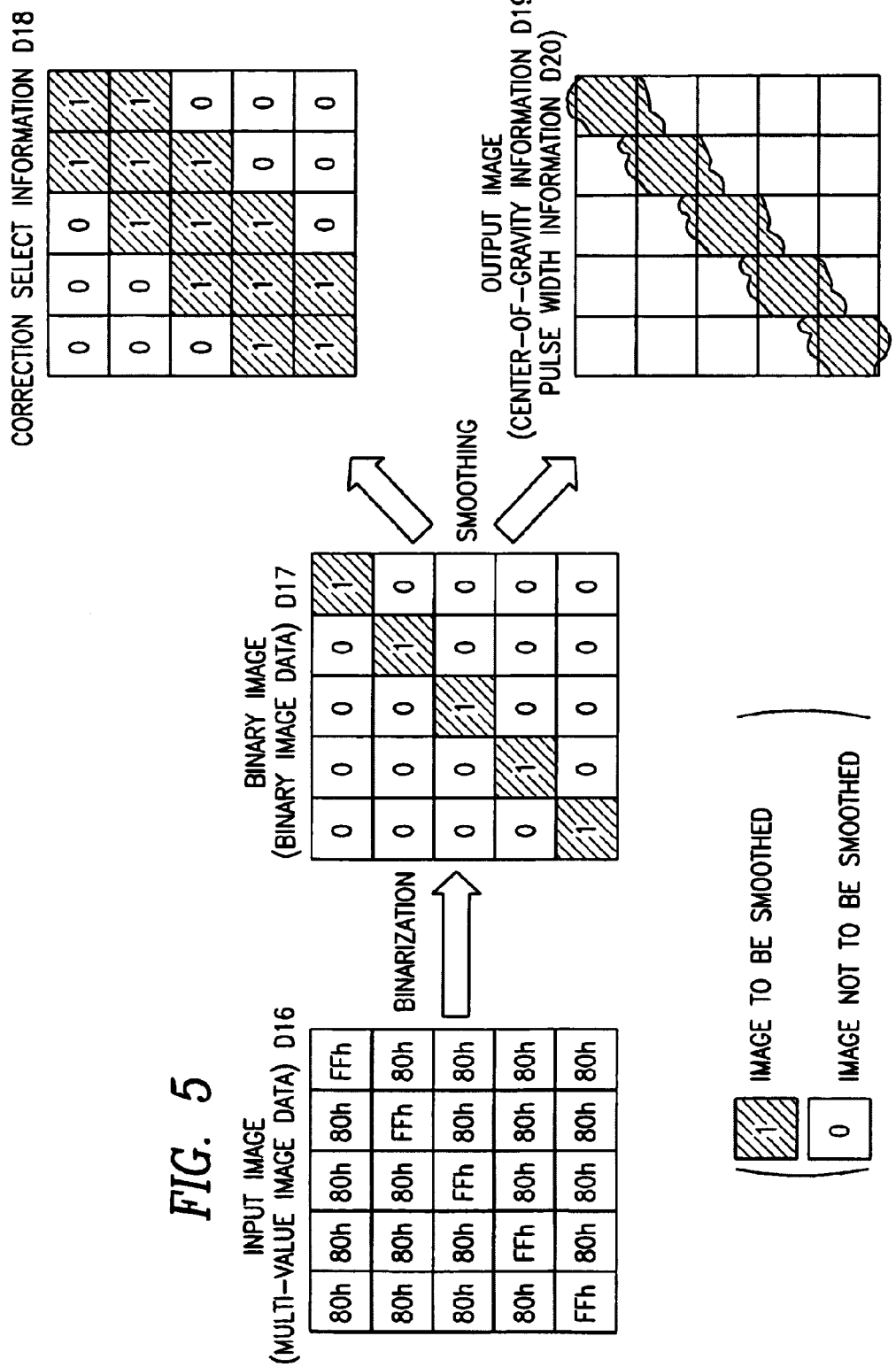
FIG. 5 is a diagram for illustrating an algorithm used in an outline correction unit 14 shown in FIG. 1.

When the smoothing correction unit 14 inputs an input image (multi-value image data) D16 shown in FIG. 5 into the binarization unit 14A, the binarization unit 14A converts pixels having the maximum intensity value (FFh) into "1" and converts the other pixels into "0" to send a binary image (binary image data) D17 shown in FIG. 5 to the smoothing unit 14B. Then, for the binary image D17 sent from the binarization unit 14A, smoothing unit 14B sends correction select information D18 shown in FIG. 5, which indicates "1" for the smoothed pixels and "0" for the pixels not smoothed, and an output image (position information D19, pulse width data D20) shown in FIG. 5 to the output unit 16.

The gradation processing unit 15 consists of a line buffer 15A and a multi-value dithering unit 15B and has the function of multi-value-dithering the multi-value image data D16 sent from the video control unit 13.

The line buffer 15A is configured so as to store multi-value image data D16 sent from the video control unit 13 and send the multi-value image data D16 to the multi-value dithering unit 15B with a predetermined timing.

The above-mentioned predetermined timing is timing with which the multi-value dithering unit 15B, which will be detailed below, dithers the same pixel on which the determination is made by the smoothing unit 14B described above.

Thus, the line buffer 15A sends the multi-value image data D16 to the multi-value dithering unit 15B with the predetermined timing.

The multi-value dithering unit 15B is configured so as to perform multi-value dithering of the multi-value data D16 sent from the line buffer 15A and send the center-of-gravity information (second center-of-gravity information) D21 of the pixel on which multi-value dithering is performed and pulse width data (second intensity information) D22, which is intensity information indicating the intensity of the pixel to the output unit 16.

This will be described in detail. The multi-value dithering unit 15B dithers the multi-value image data D16 according to pattern matching with a multi-value dither pattern D25. The multi-value dither pattern D25 is data for pre-specifying how the multi-value dithering unit 15B should perform multi-value dithering on pixels, and stored in memory 15B1 of the multi-value dithering unit 15B as shown in FIG. 1. The multi-value dithering unit 15B may be configured so as to use an intensity pattern method, for example, for intensity processing.

Therefore the multi-value dithering unit 15B is configured so as to perform multi-value dithering on the multi-value image data D16 and output to the output unit 16 the intensity position information D21 and pulse width data D22 of pixels to which the multi-value dithering is applied. This allows the output unit 16 to generate image information based on the pixel (D21, D22) when the pixels to be dithered is selected by the output unit 16, which will be detailed later.

Figure 6:
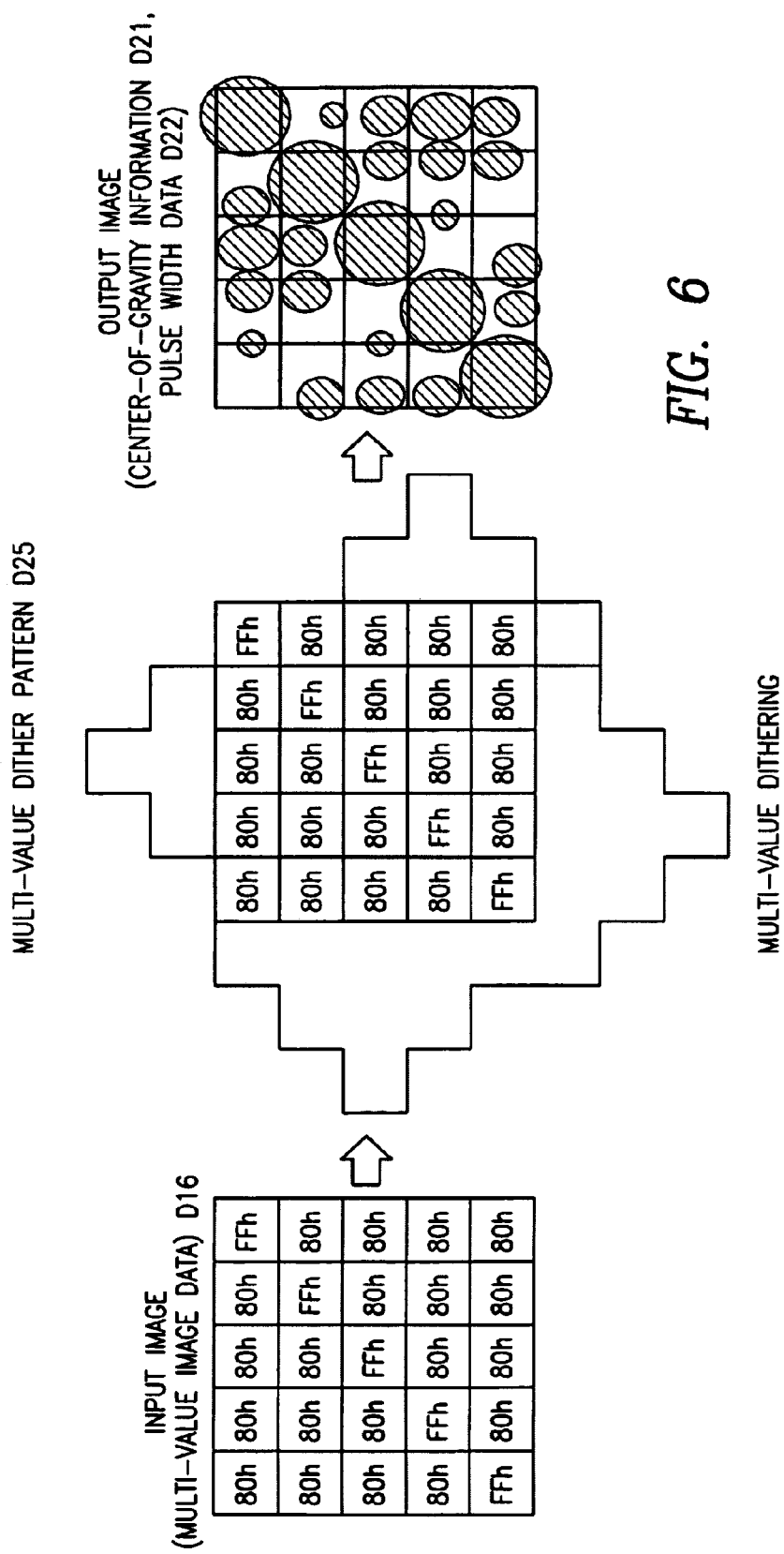
FIG. 6 is a diagram for illustrating an algorithm used in a gradation processing unit 15 shown in FIG. 1.

In this way, when the input image shown in FIG. 6 (multi-value image data) D16 is input by the above-mentioned gradation processing unit 15, the line buffer 15A first stores the input image D16, then outputs the input image D16 to the multi-value dithering unit 15B with timing of multi-value dithering the same pixel on which the determination is made whether it should be smoothed or not by the smoothing unit 14B described above. The multi-value dithering unit 15B performs multi-value dithering on the input image D16 sent from the line buffer 15A according to pattern matching with the multi-value dither pattern D25 shown in FIG. 6 stored in memory 15B1 and outputs an output image (center-of-gravity information D21, pulse width data D22) shown in FIG. 6 to the output unit 16.

The output unit 16 consists of an information select unit 16A and a pulse width modulation unit 16B. The output unit 16 has a function of selecting a pixel sent from the smoothing unit 14 or a pixel sent from the multi-value dithering unit 15B according to the correction select information D18 sent form the smoothing unit 14B and outputting image information corresponding to the pixel to the print unit 3.

The information select unit 16A is configured so as to select the pixel (center-of-gravity information D19, pulse width data D20) sent from the smoothing unit 14B if the correction select information D18 sent form the smoothing unit 14B is "1," which indicates that the pixel is to be smoothed and send the pixel (D19, D20) to the pulse width modulation unit 16B. On the contrary, if the correction select information D18 sent from the smoothing unit 14B is "0," which indicates that the pixel is not to be smoothed, the information select unit 16A selects the pixel sent (center-of-gravity information D21, pulse width data D22) from the multi-value dithering unit 15B and sends the pixel (D21, D22) to the pulse width modulation unit 16B.

Thus, in the information select unit 16A, the pixel to be smoothed is selected if the correction select information D18 indicates that the pixel is to be smoothed, or the pixel to be multi-value-dithered is selected if the correction select information indicates that the pixel is not to be smoothed, and the selected pixel is sent to the pulse width modulation unit 16B. This allows correct information about the selected pixel to be sent to the pulse width modulation unit 16B which will be described below.

The pulse width modulation unit 16B is configured so as to modulate the pulse width of a one-dot pulse based on each pixel (D19, D20; or D21, D22) sent from the information select unit 16A and output the modulated pulse to the print unit 3 as video data (image information) D23.

The pulse width modulation unit 16B therefore generates one-dot pulse video data for the pixel to be smoothed based on the center-of-gravity information D19 and pulse width data D20 and generates video data for the pixel not to be smoothed based on the center-of-gravity information D21 and pulse width data D22 of the pixel to be multi-value-dithered. This can avoid modulating the one-dot pulse generated based on the pixel (D19, D20) to be smoothed by the pixel (D21, D22) to be multi-value-dithered, allowing the video data D23 to be generated correctly.

The print unit 3 performs predetermined processes based on the video data D23 sent from the pulse width modulation unit 16B to print the data on a print sheet.

The cooperation between the above-mentioned output unit 16 and the print unit 3 will be described below.

Figure 7:
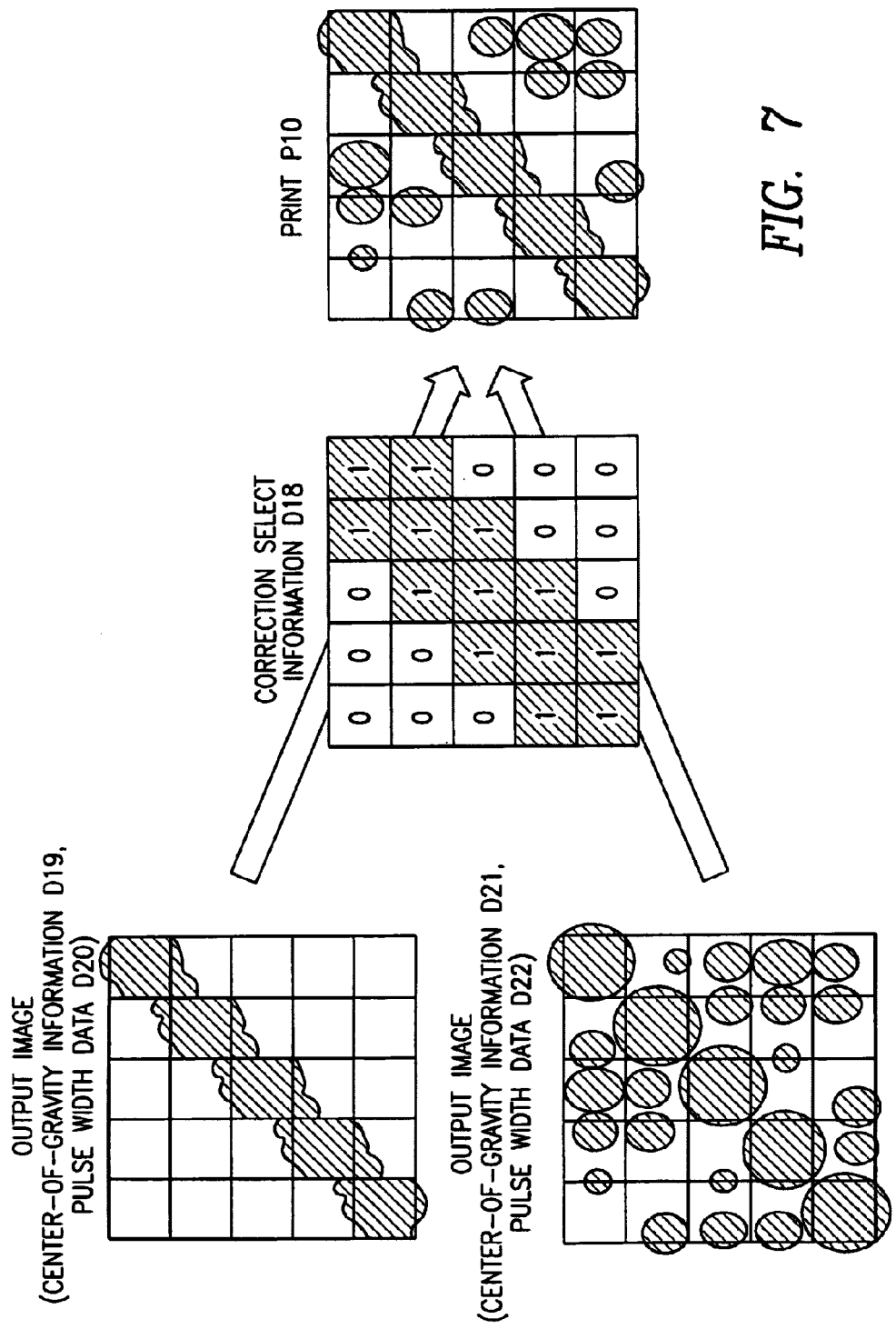
FIG. 7 is a diagram for illustrating an algorithm used in an output unit 16 shown in FIG. 1.

When an output image (center-of-gravity information D19, pulse width data D20) shown in FIG. 7 from the smoothing unit 14B and an output image (center-of-gravity information D21, pulse width data D22) shown in FIG. 7 from the multi-value dithering unit 15B are input into the output unit 16, the information select unit 16A selects the pixel (D19, D20) of the output image from the smoothing unit 14B if the correction select information D18 from the smoothing unit 14B is "1," or selects the pixel (D21, D22) from the multi-value dithering unit 15B if the correction select information D18 is "0." Then the information select unit 16A outputs the selected pixel (D19, D20; or D21, D22) to the pulse width modulation unit 16B respectively.

Then the pulse width modulation unit 16B modulates the pulse width of the one-dot pulse based on the pixel (D19, D20; or D21, D22) sent from the information select unit 16A and outputs the pulse to the print unit 3 as video data D23. The print unit 3 performs predetermined processes based on the video data D23 sent from the pulse width modulation unit 16B to print out a print P10 shown in FIG. 7.

Figure 8:
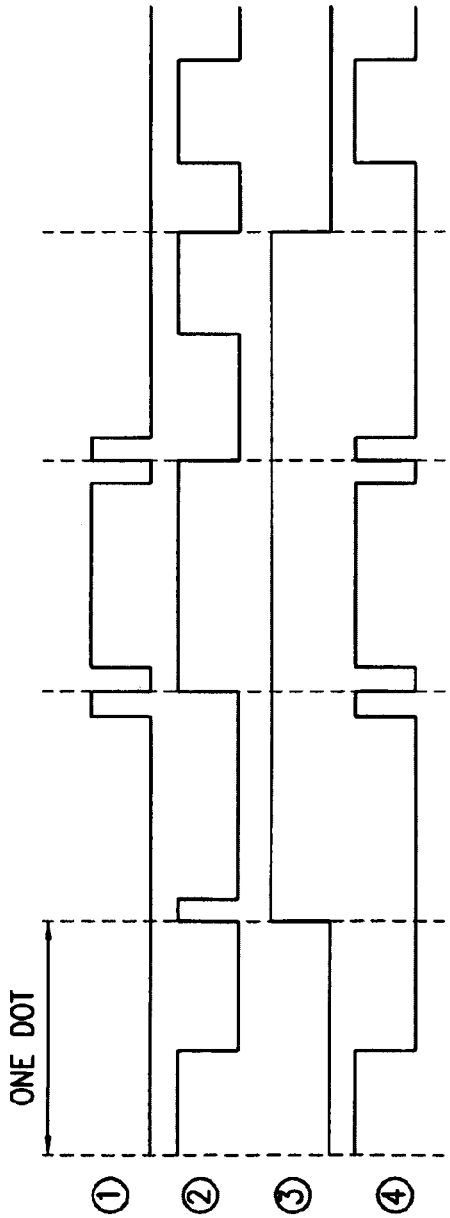
FIG. 8 is a timing chart showing an operation of the output unit 16 shown in FIG. 1.

FIG. 8 shows the timing of the operation of the output unit 16 described above. FIG. 8 shows the timing of the operation of the pulse width modulation unit 16B.

The pulse width modulation unit 16B in FIG. 8 modulates the pulse width of a one-dot pulse according to center-of-gravity information D19 and pulse width data D20 sent from the smoothing unit 14B if the correction information D18 is "1" to generate video Data 23, or modulates the pulse width of a one-dot pulse according to center-of-gravity information D21 and pulse width information D22 sent from the multi-value dithering unit 15B to generate video data D23 in the case when the correction information D18 is "0."

Figure 9:
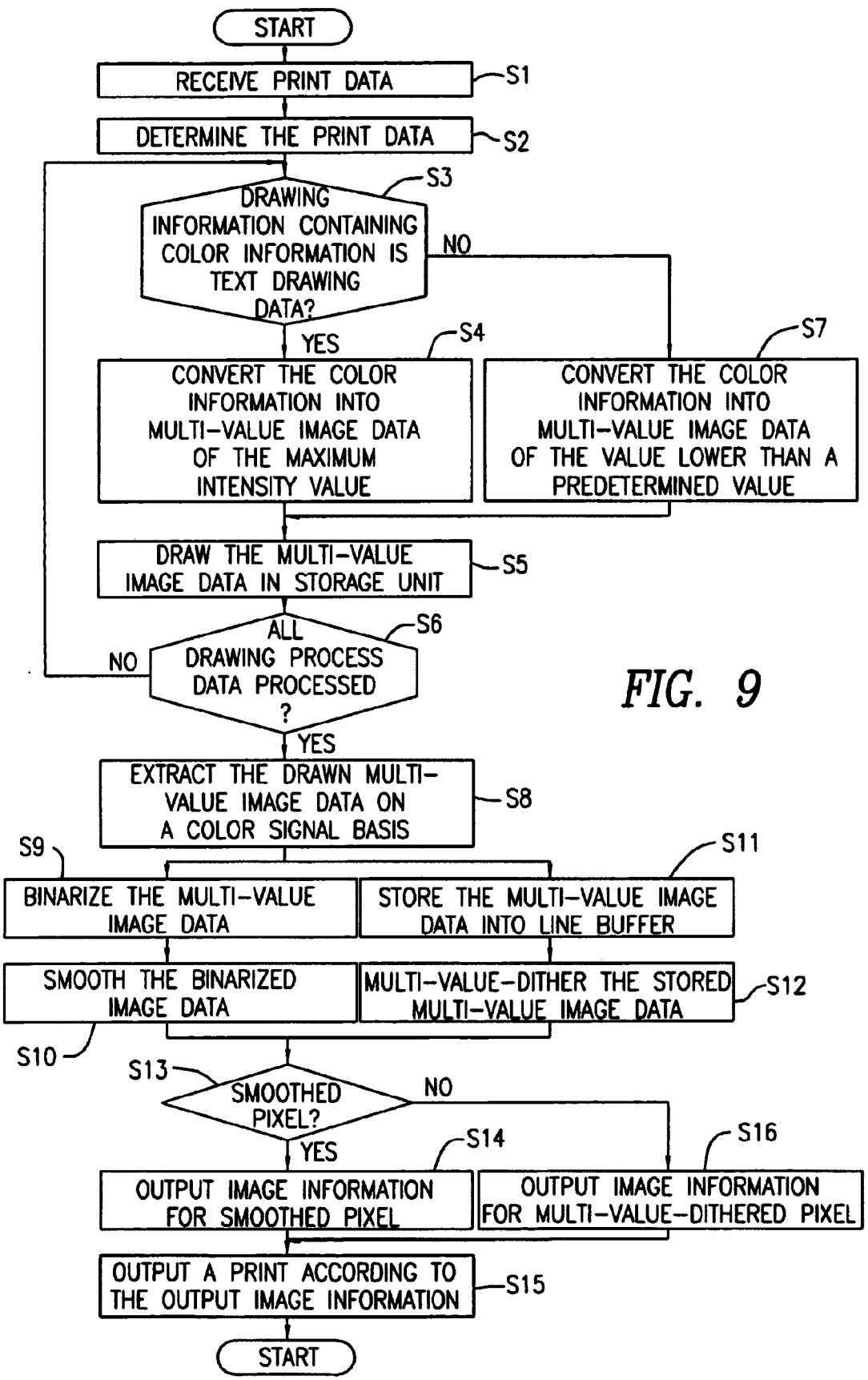
FIG. 9 is a flowchart of an operation of the image processing apparatus 1 according to the embodiment shown in FIG. 1.

Next, the general operation of the image processing apparatus 1 will be described below with reference to a flowchart in FIG. 9.

First, the drawing processing unit 10 receives print data D10 shown in FIG. 2 (step S1). Then the drawing processing unit 10 determines text drawing data in "drawing information D11," the number of characters and drawing coordinates in "drawing process information D12," R, G, and B signals in "color information D13," and character data in "Data D14" for drawing process data 1 in the print data 10 and outputs the drawing information D11 and the color information D13 to the color information conversion unit 11 (step S2: drawing analysis step).

Because the text drawing data and image drawing data are determined and text data and image data in the print data D10 are distinguished from each other, a situation can be avoided in which different types of print data D10 are processed at the same time.

Then the color spatial conversion unit 11 determines whether there is data to be processed in the drawing process unit 10 (step S3), and, if data to be processed remains, reads a predetermined amount of data, transforms the color information D13 into eight-bit multi-value image data D15 consisting of Y, M, C, and K signals and sets color information D13 exceeding a predetermined threshold at the maximum intensity value (FFh) (step S4: separate conversion setting process).

Then the drawing process unit 10 draws the multi-value image data D15 provided from the color spatial conversion unit 11 according to the drawing process information D12 and Data D14 and stores the drawn multi-value image data D16 into a multi-value image data file 12A in the storage unit 12 (step S5).

Then it is determined whether unprocessed data for drawing process data 2 remains in the print data D10 (step S6), and if unprocessed data remains, the drawing process unit 10 determines image drawing data in the "drawing information D11," coordinates and other information in the "drawing process information D12," R, G, and B signals in the "color information D13," and image data in the "Data D14" and sends the drawing information D11 and the color information D13 to the color information conversion unit 11, in the same way as the above-described operation (drawing analysis process).

The color spatial conversion unit 11 transforms the color information D13 provided from the drawing process unit 10 into eight-bit multi-value image data D15 consisting of Y, M, C, and K signals and sets the color information D13 having the maximum intensity value (FFh) at a predetermined value (FEh) lower than the maximum intensity value (step S7).

The drawing analysis process at steps S1 through S7 described above will be referred to as a first process.

The drawing process unit 10, color spatial conversion unit 11, and storage unit 12 perform operations similar to the above-described operations on drawing process data 3 to N in the print data D10 according to the determination of the drawing process data.

Because the color information D13 associated with the text drawing data is set at the maximum intensity value and the color information associated with the image drawing data is set at a value lower than the maximum intensity value, a situation can be avoided in which multi-value image data having the maximum intensity value contains image data.

Then the video control unit 13 extracts the multi-value image data D16 stored in the multi-value image data file 12A on a color signal basis of Y, M, C, and K signals in accordance with the signal 24 input from the printing unit 3 and sends the extracted multi-value image data D16 to the smoothing correction unit 14 and the gradation processing unit 15 (step S8).

Then the binarization unit 14A converts pixels in the multi-value image data D16 provided from the sent from the video control unit 13 that have the maximum intensity value, "FFh," into "1" and pixels having intensity values other than the maximum value into "0" to generate binary image data D17 and sends the binary image data D17 to the smoothing unit 14B (step S9). One example of the conversion may provide the binary image (binary image data) D17 shown in FIG. 5.

Then the smoothing correction unit 14B holds five lines of binary image data D17 sent from the binarization unit 14A and generates an correction area based on the five lines of binary image data. The smoothing correction unit 14B then smoothes the binary image data D17 provided from the binarization unit 14A according to pattern matching with the correction area. Then the smoothing correction unit 14B sends correction select information D18 indicating "1" for a pixel smoothed or "0" for a pixel that has not been smoothed, the center-of-gravity information (the first gravity information) D19 of the smoothed pixel, and the pulse width data (the first intensity information) D20 of the pixel to the output unit 16 (step S10: specific data smoothing correction process). An example of this output is shown in correction select information D18 and an output image (center-of-gravity information D19, pulse width data D20) in FIG. 5.

Because pixels to be smoothed is distinguished from pixels not to be smoothed in the binarized image data D17 and the center-of-gravity information D19 and pulse width data 20 of the pixels to be smoothed are sent to the output unit 16 in this way, the output unit, which will be detailed later, can determine whether a pixel is smoothed or not. Therefore the output unit 16 can provide always correct information (Dl9, D20) on the smoothed pixel.

The line buffer 15A stores the multi-value image data D16 sent from the video control unit 13 and sends the multi-value image data D16 to the multi-value dithering unit 15B with the timing of causing the multi-value dithering 15B which will be described below unit to perform multi-value dithering on the same pixel to be smoothed by the smoothing unit 14B described earlier (step S11).

Then the multi-value dithering unit 15B performs multi-value dithering on the multi-value image data D16 sent from the line buffer 15A according to pattern matching with the multi-value dither pattern D25 stored in the memory 15B1. The multi-value dithering unit 15B then sends the center-of-gravity information (the second center-of-gravity information) D21 and pulse width data (the second intensity information) D22 of the dithered pixel to the output unit 16 (step S12: gradation process). An example of this output is shown in an output image (center-of-gravity information D21, pulse width data D22) in FIG. 6.

The specific data smoothing correction process at steps S8 through S12 will be referred to as a second process.

As described above, the multi-value image data D16 is multi-value-dithered and the intensity information D21 and pulse width data D22 of the multi-value-dithered pixel are sent to the output unit 16. Thus, the output unit 16, which will be described below, can always provide the information (D21, D22) correctly without fail.

Then the information select unit 16A selects the pixel (center-of-gravity information D19, pulse width data D20) provided from the smoothing unit 14B and sends the pixel (center-of-gravity information D19, pulse width data D20) to the pulse width modulation unit 16B if the correction select information D18 sent from the smoothing unit 14B indicates that the pixel is smoothed, that is, "1" (step S13). The pulse width modulation unit 16B modulates the pulse width of one-dot pulse according to the center-of-gravity information D19 and pulse width data D20 sent from the smoothing unit 14B to generate video data (image information) D23 and sends the video data D23 to the print unit 3 (step S14).

The print unit 3 performs a process according to the video data D23 sent from the pulse width modulation unit 16B and outputs a print (step S15). An example of this output is shown in a print P10 in FIG. 7.

On the other hand, if the correction select information D18 sent from the smoothing unit 14B indicates that the pixel is not smoothed, that is, "0" (step S13), the information select unit 16A select the pixel (center-of-gravity information D21, pulse width data D22) provided from the multi-value dithering unit 15B and sends the pixel (D21, D22) to the pulse width modulation unit 16B. The pulse width modulation unit 16B modulates the pulse width of one-dot pulse in accordance with the center-of-gravity information D21 and the pulse width data D22 from the multi-value dithering unit 15B to generate video data D23 and sends the video data D23 to the print unit 3 (step S16).

The process at steps S13 through S16 described above will be referred to as a third process.

In this way, one-dot pulse video data is generated based on the center-of-gravity information D19 and pulse width data D20 for the pixel to be smoothed, or based on the center-of-gravity information D21 and pulse width data D22 of the pixel to be multi-value-dithered for the pixel not to be smoothed. Thus, a situation can be avoided in which a one-dot pulse based on the pixel (D19, D20) to be smoothed is modulated with a pixel (D21, D22) to be multi-valuedithered. Therefore the video data D23 is generated correctly and the sharpness and quality of images can be further improved.

While the image processing apparatus 1 has been described as a color electrophotography printer in the embodiment described above, the present invention may be applied to other apparatuses such as a facsimile, for example. Furthermore, the present invention is not limited to multicolor information. Instead, the present invention may be applied to monochrome information.

A second embodiment of the present invention will be described below with reference to FIG. 10.

Figure 10:
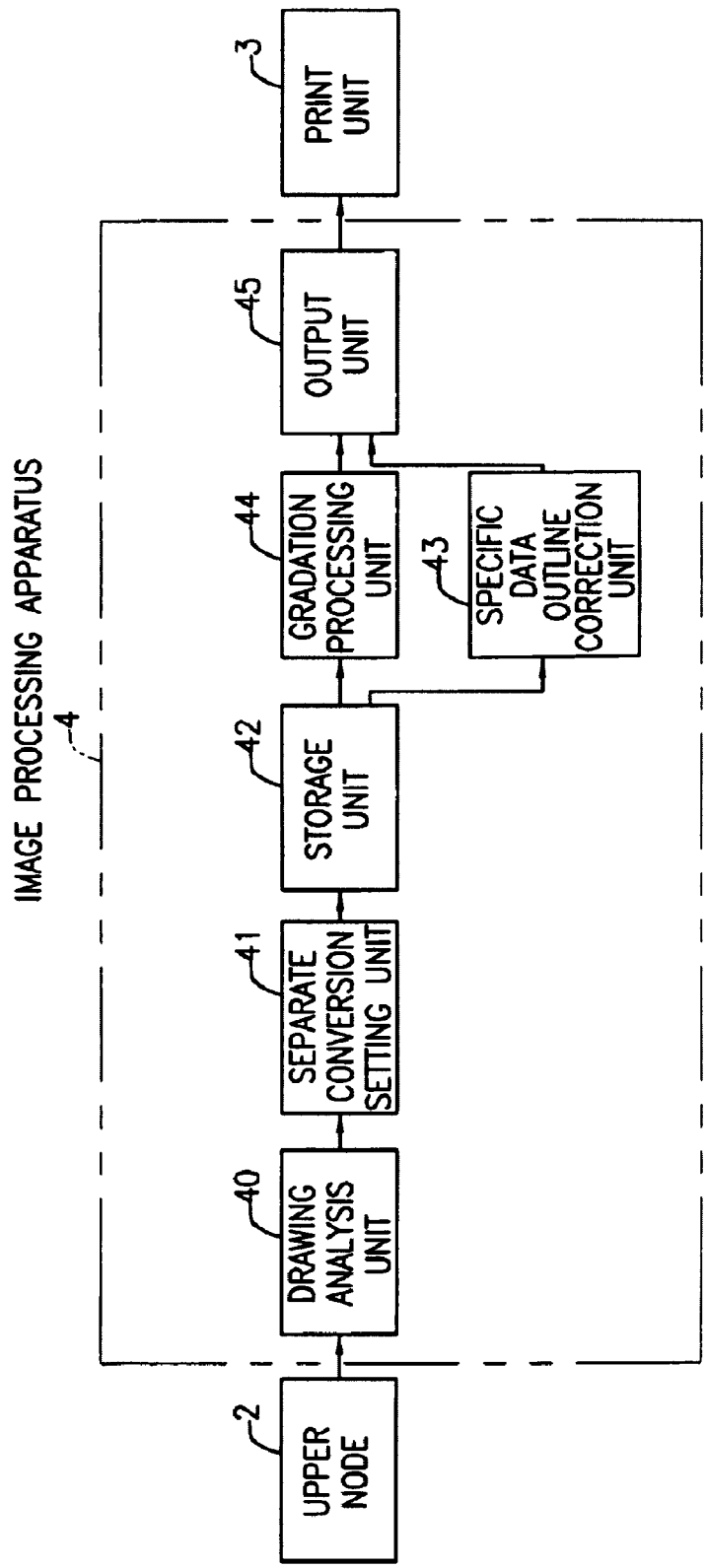
FIG. 10 is a diagram for illustrating an image processing apparatus 4 according to a second embodiment of the present invention.
Figure 11:
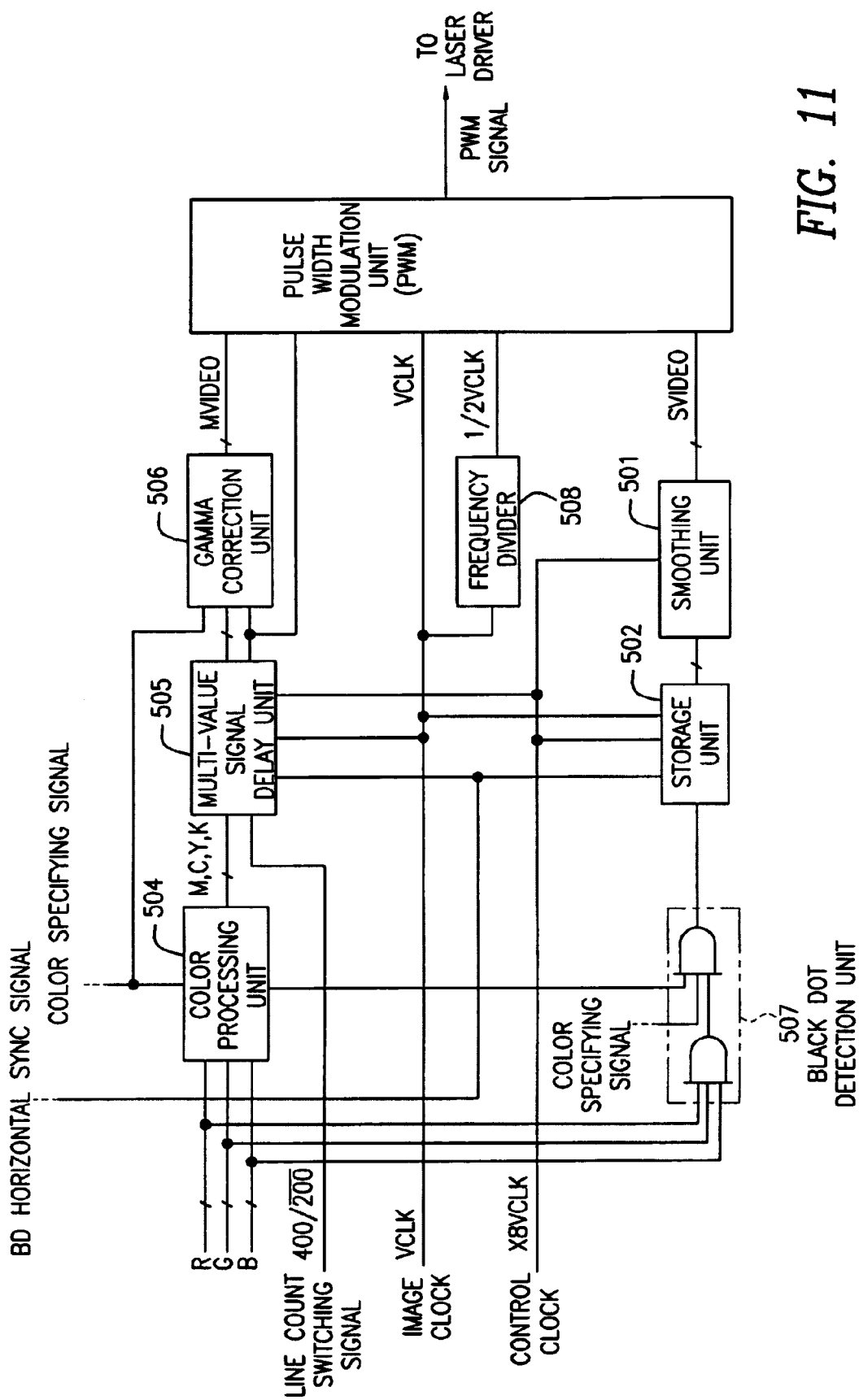
FIG. 11 is a diagram showing an example of a prior art.
Figure 12:
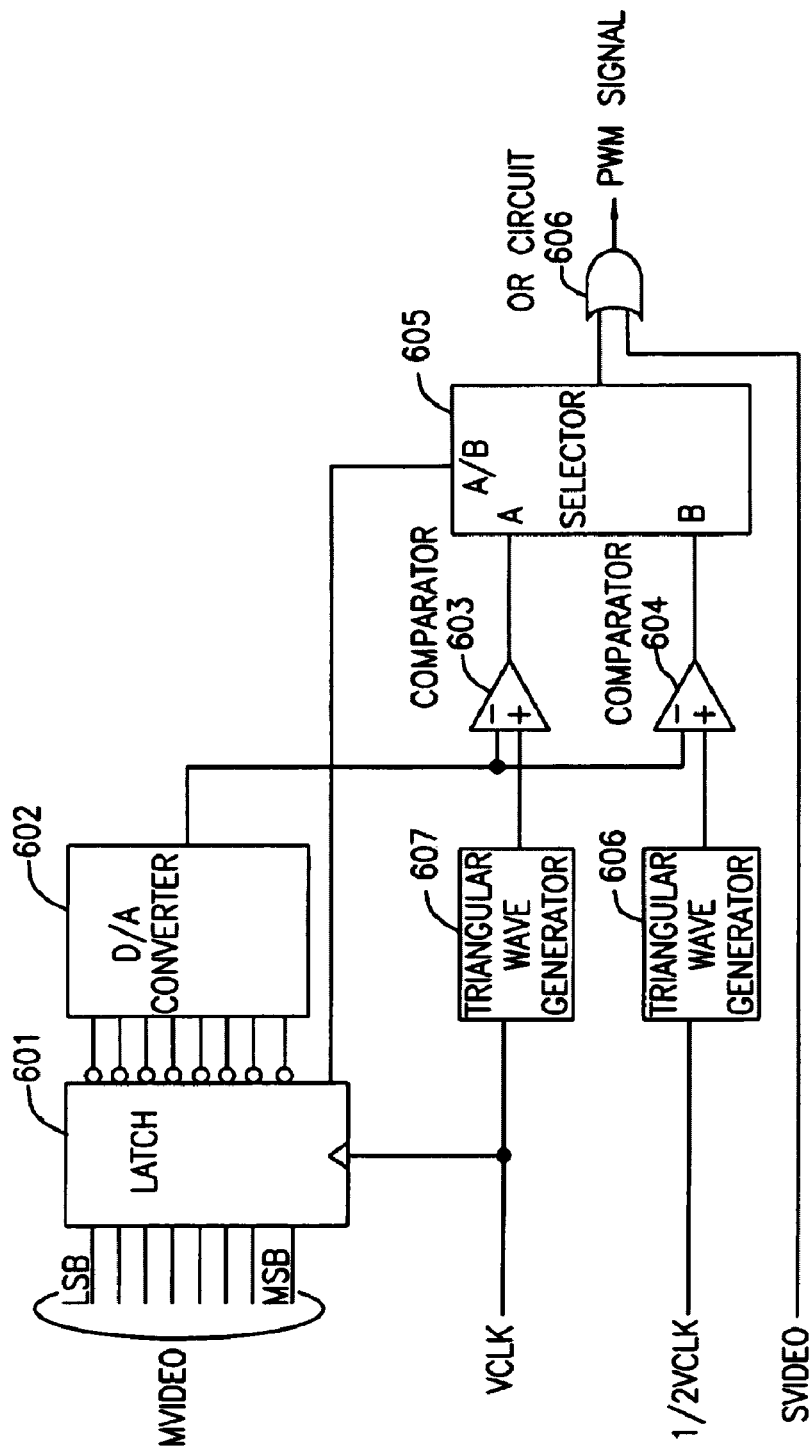
FIG. 12 is a detailed drawing of a pulse width modulation unit shown in FIG. 11.

An image processing apparatus 4 shown in a functional block diagram in FIG. 10 uses computational unit such as a central processing unit (CPU) (not shown) to execute predetermined computational programs stored in a predetermined recording medium and is designed to implement the above-described image processing method with software. In the following description, like terms have like meaning of like terms used in the foregoing description.

The image processing apparatus 4 first analyzes print data D10 containing color information D13 sent from an upper node 2 into text drawing data representing the drawing of characters and lines and image drawing data representing other drawing (drawing analysis unit 40). Then the image processing apparatus 4 performs the conversion of the color information D13 according to the text drawing data or image drawing data analyzed by the drawing analysis unit 40 (separate conversion setting unit 41).

The operation of the separate conversion setting unit 41 will be detailed below.

In the separate conversion setting unit 41, the image processing apparatus 4 sets the intensity of all the color information D13 associated with the specific text drawing data analyzed by the drawing analysis unit 40 at a certain intensity value (FFh) and separately sets the intensity of all the color information D13 associated with the image drawing data analyzed by the drawing analysis unit 40 at a predetermined value (FEh) below the maximum intensity value (where, FFh≠FEh).

Thus the text drawing data and image drawing data are analyzed and text data and image data in the print data D10 are distinguished from each other, avoiding a situation in which different types of print data D10 are processed at the same time. Therefore text data in the print data can be identified faster.

The image processing apparatus 4 draws and stores (in storage unit 42) the print data D10 set by the separate conversion setting unit 41.

Then the image processing apparatus 4 smoothes specific text image data D16 in the print data D10 (in specific data outline correction unit 43) stored in the storage unit 42. The image processing apparatus 4 multi-value-dithers (in gradation processing unit 44) the image data D16 stored in the storage unit 42 at the same time as, before, or after smoothing the specific text image data D16 in the specific data outline correction unit 43. FIGS. 5 and 6 show examples of the implementations in the above-mentioned specific data outline correction unit 43 and the above-mentioned gradation processing unit 44.

Then, the image processing apparatus 4 outputs (in output unit 45) the text image data (center-of-gravity information D19, pulse width data D20) smoothed by the specific data outline correction unit 43 to an (external) print unit 3 by priority over the text image data (center-of-gravity information D21, pulse width data D22) gradation-processed by the gradation processing unit 44.

Therefore the text image data to be smoothed is output to the outside by priority over the text image data to which a gradation process is applied. That is, the text image data to be smoothed is directly output to the outside without gradation processing. Thus, the problem with the prior art that it lacks quickness and the correctness of smoothing correction because text image data to be smoothed is modulated by gradation processing and the modulated text image data is output to the outside can be effectively avoided.

A computer-readable recording medium on which a program for outputting images according to the present invention may be a semiconductor memory, magnetic recording medium, optical recording medium, or other recording media on which a program for causing a computer to operate.

Because of the configuration and functionality described above, the drawing analysis function of a receiving unit distinguishes between text image data and other image data according to the present invention set forth in claim 1. Thus, the text image data in print data is identified from other image data in the print data and outline correction is applied to the text image data, thereby significantly improving the correctness of outline correction of print data compared with the prior art, which performs outline correction of print data without regard to types of data.

According to the present invention set forth in claim 2, types of data contained in print data are distinguished from each other and the intensity of color information is set for each type. Therefore a situation can be effectively avoided in which text image data and other types of image data are mixed in image data for which a certain intensity value is set. This ensures that an outline correction unit for performing outline correction of the image data having the certain intensity value performs the outline correction on the text image data only. Thus, the outline of diagonal lines of dark color characters and graphics can be properly corrected.

According to the present invention set forth in claim 3, even if text image data to which outline correction is applied is output as print image information to the outside, an output unit can effectively operate to directly output the text image data on which outline correction is performed to the outside without applying gradation processing to the text image data. Therefore the problem with the prior art can be effectively avoided that the precision of print image information is decreased because text image data to which outline correction is applied is gradation-processed and output to the outside.

According to the present invention set forth in claim 4, the separate conversion setting function of a color information conversion unit corrects the outline of only text image data in print data and the text image data is directly output as print image information to the outside. Therefore the problem of the prior art can be effectively avoided that the precision of print image information is decreased because image data other than text image data is outline-corrected or text image data to be outline-corrected is gradation processed by a gradation processing unit and output to the outside.

According to the present invention set forth in claim 5, the intensity value of only certain text image data in print data is set at the maximum intensity value and only the text image data having the maximum intensity value is outline-corrected. Therefore the outline of diagonal lines of dark color characters and graphics is properly corrected and the sharpness and quality of images can be increased.

The present invention set forth in claim 6 avoid the problem with the prior art that the correctness of outline correction is impaired because one-dot image information based on a pixel to be outline-corrected is modulated with second center-of-gravity information and second intensity information of a pixel to be gradation-processed. Therefore the outline of diagonal lines of dark color characters and graphics is properly corrected and the sharpness and quality of images can be further increased.

According to the present invention set forth in claim 7, because only the pixels of text image data in print data are converted into "1," only the pixels of the text image data converted into "1" are outline-corrected by using pattern matching. Therefore the outline of diagonal lines of dark color characters and graphics is accurately corrected and the sharpness and quality of images can be increased.

According to the present invention set forth in claim 8, the same pixel to be outline-corrected by the outline correction unit is multi-value-dithered by a multi-value dithering unit according to a multi-value dithering pattern. Therefore the outline of diagonal lines of dark color characters and graphics is properly corrected and the sharpness and quality of images can be further increased.

According to the present invention set forth in claim 9, image data is processed by the outline correction unit and the gradation processing unit separately, thereby avoiding the problem that information to be outline corrected is gradation-processed by the gradation processing unit. Therefore the outline of diagonal lines of dark color characters and graphics is properly corrected and the sharpness and quality of images can be further increased.

According to the present invention set forth in claim 10, text image data in print data is distinguished from other image data in the print data in a first process and the text image data in the print data is identified and outline-corrected in a second process, thereby significantly increasing the correctness of outline correction of print data compared with the prior art, which performs outline correction of print data without regard to types of data.

According to the present invention set forth in claim 11, types of data in print data are distinguished from each other and the intensity values of color information are set for each type in the first process. Therefore, a situation in which image data other than text image data is mixed in image data for which a certain intensity value is set can be effectively avoided and only text image data having a certain intensity value is smooth-outline-corrected in the second process. Therefore the outline of diagonal lines of dark color characters and graphics can be properly corrected.

According to the present invention set forth in claim 12, even if text image data to which outline correction is applied is output as print image information to the outside, the outline-corrected text image data can be directly output to the outside without being gradation processed. Therefore the outline of diagonal lines of dark color characters and graphics is properly corrected and the sharpness and quality of images can be further increased.

According to the present invention set forth in claim 13, only text image data in print data is correctly outline-corrected in the first process and the outline-corrected text image data is directly output as print image information to the outside in a third process. Thus, the problem with the prior art can be effectively avoided that the precision of print image information is decreased because image data other than text image data is outline-corrected in the first process or the text image data outline-corrected is gradation-processed and output to the outside. Therefore the outline of diagonal lines of dark color characters and graphics is properly corrected and the sharpness and quality of images can be further increased.

According to the present invention set forth in claim 14, text image data in print data is distinguished from other image data in the print data and the text image data in the print data is identified to perform outline correction on the text image data. Therefore the correctness of outline correction of print data is significantly increased compared with the prior art, which performs outline correction of print data without regard to types of data.

According to the present invention set forth in claim 15, types of data in print data are distinguished from each other and the intensity of color information is set for each type of data. Thus, a situation in which image data other than text image data is mixed in image data for which a certain intensity value is set can be avoided and only the text image data having the certain intensity value can be outline-corrected quickly. Therefore the outline of diagonal lines of dark color characters and graphics is properly corrected.

According to the present invention set forth in claim 16, only text image data in print data is correctly outline-corrected, and the outline-corrected text image data is directly output as print image information to the outside. Thus, the problem with the prior art can be effectively avoided that the precision of print image information is decreased because image data other than text image data is outline-corrected or text image data to be outline-corrected is gradation-processed and output to the outside. Therefore the outline of diagonal lines of dark color characters and graphics is properly corrected and the sharpness and quality of images can be further increased.

According to the present invention, which is configured and operates as described above, the outline of diagonal lines of only dark color characters and graphics is processed and correct print image information is output to the outside, thereby providing a unprecedentedly good image processing apparatus, a image processing method, and a computer-readable recording medium on which a image processing program is recorded that allows the sharpness and quality of images to be improved correctly and easily.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-60188 (Filed on Mar. 6, 2000) including specification, claims, drawings and summary are incorporated herein by reference in its entirety.

What is claimed is:

1. An image processing apparatus, comprising:
   a receiving unit for receiving predetermined print data sent from an upper node;
   an outline correction unit for outline-correcting said print data based on information output from the receiving unit; and
   an output unit for performing a predetermined process on said print data based on outline process information output from the outline correction unit and outputting said print data to an outside as print image information,
   wherein, said receiving unit has a drawing analysis function of analyzing said print data into text drawing data representing the drawing of characters and lines contained in said print data and image drawing data representing the drawing of data other than the text drawing data contained in said print data, and said outline correction unit has a specific data outline correction function of executing outline correction on specific text image data output from said receiving unit.

2. The image processing apparatus according to claim 1, wherein said outline correction unit comprises a binarization unit for binarizing image data to generate binary image data and an outline processing unit for outline-processing the binary image data output from said binarization unit with pattern recognition.

3. An image processing apparatus, comprising:

a receiving unit for receiving predetermined print data containing color information sent from an upper node;

a color information conversion unit for transforming said print data received by said receiving unit into information about color;

an outline correction unit for outline-correcting said print data based on information output from said color information conversion unit; and an output unit for performing a predetermined process on said print data based on outline process information output from the outline correction unit and outputting said print data to an outside as print image information, wherein, said receiving unit has a drawing analysis function of analyzing said print data into text drawing data representing the drawing of characters and lines contained in said print data and image drawing data representing the drawing of data other than the text drawing data contained in said print data, said color information conversion unit has a separate conversion setting function for setting color information associated with specific text drawing data output from said receiving unit at a certain intensity value and separately setting color information associated with image drawing data output from said receiving unit at a predetermined value below a maximum intensity value, and said outline correction unit has a specific data outline correction function of executing outline correction on specific text image data output from said color information conversion unit.

4. The image processing apparatus according to claim 3, wherein said separate conversion setting function of said color information conversion unit is specialized to set any color information associated with text drawing data output from said receiving unit and having an intensity value exceeding a predetermined threshold at the maximum intensity value.

5. An image processing apparatus, comprising: a receiving unit for receiving predetermined print data sent from an upper node;

a outline correction unit for outline-correcting said print data based on information output from the receiving unit;

a gradation processing unit for processing the a gradation of said print data based on information output from said receiving unit; and an output unit for performing a predetermined process on said print data based on outline processing information output from said outline correction unit and gradation processing information output from said gradation processing unit and outputting said print data as print image information, wherein said receiving unit has the a drawing analysis function of analyzing said print data into text drawing data representing a drawing of characters and lines contained in said print data and image drawing data representing a drawing of data other than the text drawing data contained in said print data, said outline correction unit has a specific data outline correction function of executing outline correction on specific text image data output from said receiving unit, said gradation processing unit is provided with gradation processing function for processing a gradation of the image data output from said receiving unit, and said output unit has a text priority output function for outputting text image data output from said outline correction unit to the outside by priority over text image data output from said gradation processing unit.

6. The image processing apparatus according to claim 5, wherein said outline correction unit is configured so as to output, to said output unit, correction select information indicating whether a pixel is to be corrected or not, first intensity information indicating the intensity of said pixel to be corrected, and first center-of-gravity information indicating the center-of-gravity of said pixel, said gradation processing unit is configured so as to output second intensity information indicating the intensity of a pixel to be gradation processed and second center-of-gravity information indicating the center-of-gravity of said pixel to said output unit, and said output unit selects said first intensity information and said first center-of-gravity information of said corresponding pixel output from said outline correction unit on a dot basis to output it as the print image information to the outside if a pixel to be corrected is output from said outline correction unit, or selects said second intensity information and said second center-of-gravity information of said corresponding pixel output from said gradation processing unit on a dot basis to output it as the print image information to the outside if a pixel not to be corrected is output from said outline correction unit.

7. The image processing apparatus according to claim 5, wherein said gradation processing unit comprises a line buffer for storing image data corresponding to a pixel of interest in performing said specific data outline correction function and a multi-value dithering unit for performing a multi-value dithering on the image data stored in said line buffer according to a pre-specified multi-value dither pattern.

8. The image processing apparatus according to claim 5, wherein said outline correction unit and said gradation processing unit are configured so as to accept image data according to a timing signal.

9. An image processing apparatus, comprising: a receiving unit for receiving predetermined print data containing color information sent from an upper node;

a color information conversion unit for transforming said print data received by said receiving unit into information about color;

an outline correction unit for outline-correcting said print data based on information output from said color information conversion unit;

a gradation processing unit for processing a gradation of said print data based on information output from said receiving unit; and an output unit for performing a predetermined process on said print data based on outline process information output from said outline correction unit and gradation processing information output from said gradation processing unit and outputting said print data as print image information, wherein said receiving unit has a drawing analysis function of analyzing said print data into text drawing data representing a drawing of characters and lines contained in said print data and image drawing data representing a drawing of data other than the text drawing data contained in said print data, said color information conversion unit has a separate conversion setting function for setting color information associated with specific text drawing data output from said receiving unit at a certain intensity value and separately setting color information associated with image drawing data output from said receiving unit at a predetermined value below the maximum intensity value, said outline correction unit has the specific data outline correction function of performing outline correction on specific text image data output from said color information conversion unit, said gradation processing unit has a gradation processing function of processing the gradation of image data output from said color information conversion unit, and said output unit has the output function for outputting text image data output from said outline correction unit to the outside by priority over text image data output from said gradation processing unit.

10. An image processing method, comprising: a first step of receiving predetermined print data containing color information sent from an upper node and drawing it in a storage unit;
a second step of outline-correcting said predetermined image data drawn in said storage unit; and
a third step of outputting said outline-corrected image data as print image information to a print unit,
wherein said first step comprises:
a drawing analysis step of analyzing said predetermined print data into text drawing data representing a character or line contained in said predetermined print data and image drawing data representing other drawing;
a separate conversion setting step of setting all color information associated with specific text drawing data analyzed in said drawing analysis step at a certain intensity value and separately setting all color information associated with the image drawing data analyzed in said drawing analysis step at a predetermined value below the maximum intensity value; and
a drawing step of providing the converted print data to said storage unit to draw said print data in said storage unit, and
the image data in said second process is specific text image data.

11. An image processing method, comprising: a first step of receiving predetermined print data sent from an upper node and drawing said print data in a storage unit; a second step of performing outline correction processing and/or gradation processing on said predetermined image data drawn in said storage unit; and
a third step of outputting said outline-corrected image data and said gradation-processed image data as print image information to a print unit,
wherein said first step is designed so as to analyze said predetermined data into text drawing data representing a character or line contained in said predetermined data and image drawing data representing other drawings and provide the image data to the storage unit,
said second step comprises a specific data outline correction step of outline-correcting specific text image data stored in said storage unit and a gradation processing steps of processing the gradation of image data drawn in said storage unit at the same time as, before, or after said specific data outline correction step, and said third step is designed so as to output the text image data outline-corrected in said specific data outline correction step by priority over a text image data gradation-processed in said gradation processing step.

12. An image processing method, comprising: a first step of receiving predetermined print data containing color information sent from an upper node and drawing it in a storage unit;
a second step of outline-correcting and/or gradation-processing said predetermined image data drawn in said storage unit; and
a third step of outputting said outline-corrected image data and said gradation-processed image data as print image information to a print unit, wherein said first step comprises:
a drawing analysis step of analyzing said predetermined data into text drawing data representing a character or line contained in said predetermined data and image drawing data representing other drawing;
a separate conversion setting step of setting all color information associated with specific text drawing data analyzed in said drawing analysis step at image data with a predetermined value below a certain intensity value and separately setting all color information associated with an image drawing data analyzed in said drawing analysis step at image data with a predetermined value below a maximum intensity value; and
a drawing step of providing said image data to said storage unit to draw said print image data in said storage unit,
said second step comprises a specific data outline correction step of outline-correcting specific text image data stored in said storage unit and a gradation processing steps of processing the gradation of image data drawn in said storage unit at the same time as, before, or after said specific data outline correction step, and
said third step is designed so as to output the text image data outline-corrected in said specific data outline correction step by priority over the a text image data gradation-processed in said gradation processing step.

13. A computer-readable recording medium on which a program is recorded for causing a computer to perform image processing, comprising:
a drawing analysis process for analyzing predetermined print data containing color information sent from an upper node into text drawing data representing a character or line in said print data and image drawing data representing other drawings contained in said print data;
a separate conversion setting process for setting all color information associated with said analyzed specific text drawing data at a certain intensity value and separately setting color information associated with the analyzed image drawing data at a predetermined value below the maximum intensity value;
a storing process for drawing and storing the converted print data;
a specific data outline correction process for outline-correcting specific text image data in said stored print data; and
a output process for outputting said outline-corrected text image data as print image information to a print unit.

14. A computer-readable recording medium on which a program is recorded for causing a computer to perform image processing, comprising:
- a drawing analysis process for analyzing predetermined print data containing color information sent from an upper node into text drawing data representing a character or line in said print data and image drawing data representing other drawings contained in said print data;
- a separate conversion setting process for setting all color information associated with said analyzed specific text drawing data at a certain intensity value and separately setting color information associated with the analyzed image drawing data at a predetermined value below the maximum intensity value;
- a storing process for drawing and storing the converted print data;
- a specific data outline correction process for outline-correcting specific text image data in said stored print data;
- a gradation process for processing the gradation of the stored image data at the same time as, before, or after said specific data outline process; and
- an output process for outputting a text image data outline-corrected in said specific data outline correction process by priority over a text image data gradation-processed in said gradation process.

* * * * *